United States Patent [19]
Ozeki

[11] Patent Number: 4,989,330
[45] Date of Patent: Feb. 5, 1991

[54] OVERHEAD TYPE FILE SHEET PROJECTORS, AND FILE SHEETS AND JACKET HOLDERS FOR USE IN SUCH PROJECTORS

[75] Inventor: Jiro Ozeki, Tokyo, Japan
[73] Assignee: Slidex Corporation, Tokyo, Japan
[21] Appl. No.: 301,391
[22] Filed: Jan. 25, 1989
[51] Int. Cl.$^5$ .............................................. G03B 21/14
[52] U.S. Cl. ........................... 353/27 R; 353/DIG. 5; 353/120; 353/108
[58] Field of Search ..................... 353/25, 27 R, 27 A, 353/120, DIG. 5, DIG. 3, DIG. 4, 23, 24, 108

[56] References Cited

U.S. PATENT DOCUMENTS

| | | | |
|---|---|---|---|
| 2,540,872 | 2/1951 | Fleischer | 353/DIG. 3 X |
| 3,751,153 | 8/1973 | Naito | 353/120 X |
| 3,807,850 | 4/1974 | Ozeki | 353/23 |
| 4,184,754 | 1/1980 | Ozeki | 353/DIG. 5 X |

FOREIGN PATENT DOCUMENTS

| | | | |
|---|---|---|---|
| 5330327 | 3/1978 | Japan . | |
| 18817 | 5/1980 | Japan | 353/26 R |
| 47030 | 4/1981 | Japan | 353/DIG. 3 |
| 1445195 | 8/1976 | United Kingdom | 353/26 R |

Primary Examiner—Harry N. Haroian
Attorney, Agent, or Firm—Fleit, Jacobson, Cohn, Price, Holman & Stern

[57] ABSTRACT

An overhead type file sheet projector including a projector body with a cover provided at an upper face opening thereof, a light source and a projecting condenser lens placed in the projector body. A support arm extends from one side of the projector body to above the projecting condenser lens with a reflecting mirror and a projecting lens system held by the support arm. A stage movably is fitted to guide rails provided at opposite sides of an upper portion of the projector body, and guide members are provided on the stage. The guide members allow movement of the file sheet in a direction orthogonal to the guide rails. A file sheet and a jacket holder for use in the overhead type file sheet projector include pitch movement cuts formed at at least one edge of the file sheet body or the jacket holder body. The pitch movement cuts are formed such that the pitch movement cuts may be engaged with a file sheet movement fitting member formed on a stage movably placed on an upper portion of the projector body.

7 Claims, 10 Drawing Sheets

FIG_7

OVERHEAD TYPE FILE SHEET PROJECTORS, AND FILE SHEETS AND JACKET HOLDERS FOR USE IN SUCH PROJECTORS

BACKGROUND OF THE INVENTION (1) Field of the Invention:

The present invention relates to overhead type file sheet projectors which can directly project slides in an enlarged scale in the state that they are held in a file sheet, file sheets and jacket holders for use in such overhead type file sheet projectors.

Figure 14:
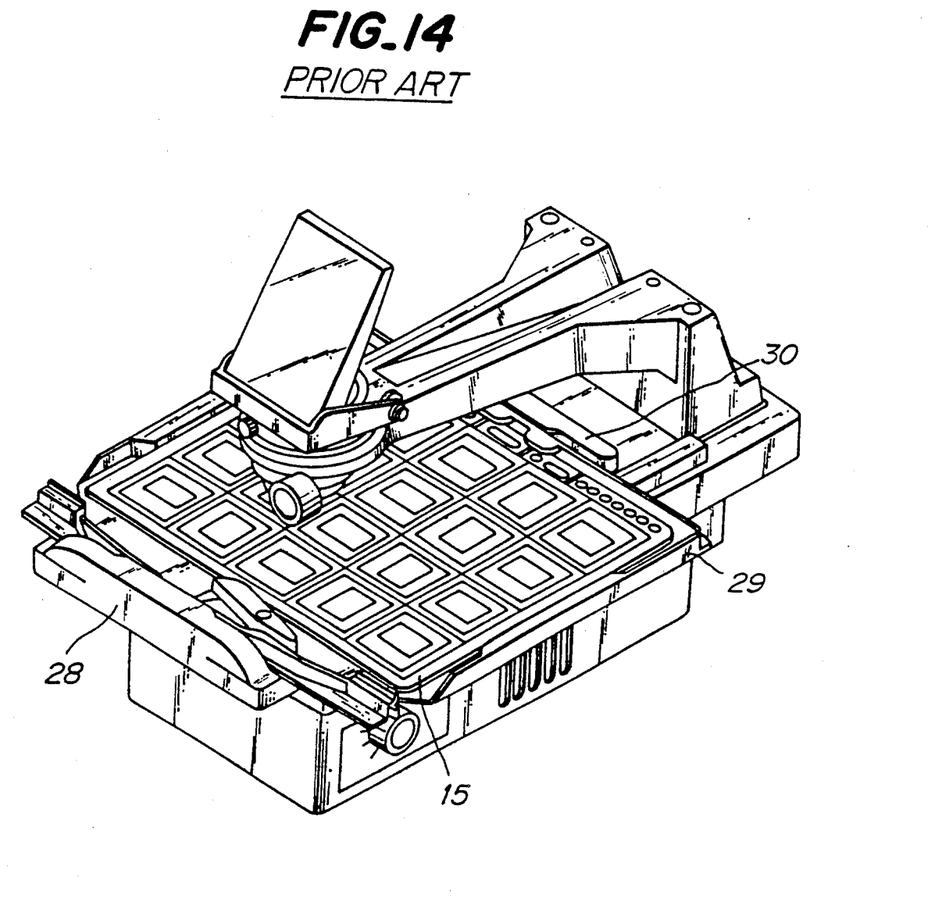
FIGS. 14 and 15 are a perspective view of a conventional projector and an exploded view of a part of the conventional projector, respectively.
Figure 15:
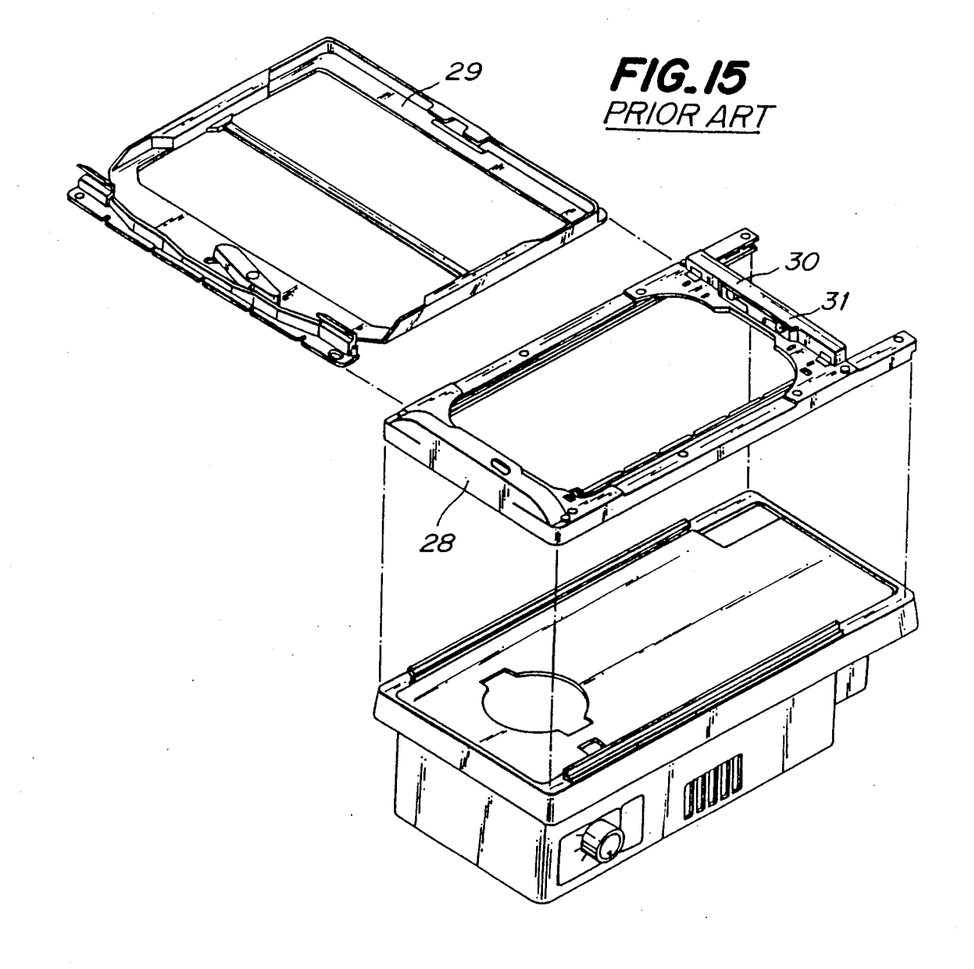

(2) Related Art Statement:

As shown in FIGS. 14 and 15, in a conventional overhead type file sheet projector, a lower stage 28 is movable to-and-fro by means of guide rails provided on opposite sides of a projector body at an upper portion thereof, and an upper stage 29 is fitted to guides 30 provided at front and rear upper end portions of the lower stage 28 in a direction orthogonal to the guide rails. The upper stage is slidably right and left supported by guide rollers 31. A file sheet 15 to which a number of color slides are preliminarily mounted is fitted to the upper stage 29, and the color slides are located and projected at a given position by moving the stage to-and-fro and right and left.

However, in such a conventional projector, when a hard file sheet having a relatively great thickness is to be mounted on the upper stage, members for locating and holding the file sheet in place must be provided at four sides of the upper stage so that the file sheet may not slip. Therefore, since the file locating holders hinder fitting and detachment of the file sheet, smooth fitting and detachment could not be made. In particular, since the vertical length varies among file sheets, the file sheet having a shorter length needs to be pressed and fixed to one side by using a spring.

Further, since the conventional projector is provided with two stages, its construction is complicated and operation of both the stages is troublesome.

SUMMARY OF THE INVENTION

It is an object of the present invention to solve the above-mentioned problems, and to provide an overhead type file sheet projector which makes attachment and detachment of a file easy and facilitates movement of the file to a desired location.

It is another object of the present invention to provide a file sheet for use in such a projector.

It is still another object of the present invention to provide a jacket holder for use in such a projector.

In order to accomplish the above objects, according to a first aspect of the present invention, there is a provision of an overhead type file sheet projector comprising a projector body having a cover at an upper face opening thereof, a light source and a projecting condenser lens placed inside the projector body, a support arm extending from one side of the projector body to above the projecting condenser lens, a reflecting mirror and a projecting lens system held by the support arm, a stage arranged movably by means of guide rails provided at opposite sides of the projector body at its upper portion, and guide members provided on the stage for making the file sheet movable in a direction orthogonal to the guide rails. By so constructing, the file can easily be attached and detached, and the movement of the file sheet is facilitated.

Second and third aspects of the present invention are contrived to be suited for the projector according to the first aspect of the present invention.

That is, if a conventional file sheet is to be fitted to the projector of the first aspect of the present invention, it is difficult to rapidly locate color slides held by the file sheet at the projecting site. Namely, if the stage itself is moved on the projector body, the stage will be able to be moved at a specific pitch relative to the projector body through pitch grooves and a pitch roller corresponding to the size of frames of the file sheet. However, it is difficult to move the file sheet only on the stage at the pitch.

In view of this, according to the second aspect of the present invention, there is a provision of a file sheet comprising a file sheet body on which a plurality of slides are to be detachably attached, and pitch movement cuts which are formed at at least one edge of the file sheet body and which are to be engaged with a file sheet pitch movement-engaging member formed on the stage placed on the projector body movably in a given direction.

According to the third aspect of the present invention, there is a provision of a jacket holder comprising a holder body for sandwiching a jacket by which slide film strips are held, and pitch movement cuts which are provided at at least one side of the holder body and which are to be engaged with a file sheet pitch movement-engaging member formed on the stage placed on the projector body movably in a given direction.

By adopting the second or third aspect of the present invention, the file sheet only can appropriately and rapidly be moved on the stage at a specific pitch.

These and other objects, features and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
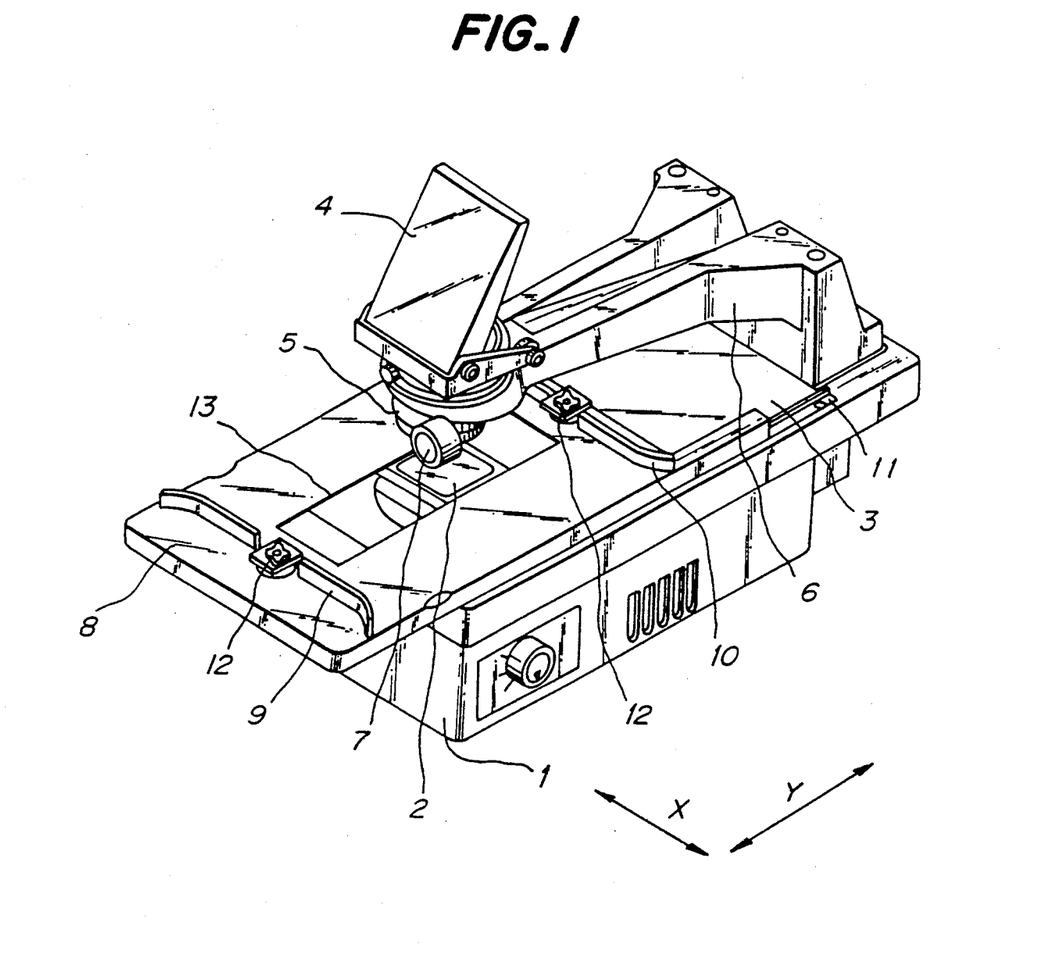
FIG. 1 is an entirely perspective view of a first embodiment of the present invention.

FIG. 1 is a perspective view of the first embodiment of the overhead type file sheet projector according to the present invention. Reference numerals 1, 2, 3 and 4 are a projector body, a projecting condenser lens, a translucent plate covering the upper face of the projector body 1, and a reflecting mirror, respectively. Reference numerals 5, 6, and 7 are a projecting lens system, a support arm extending from the rear side of the projector body 1 to above the projecting condenser lens 2, and an adjusting screw for the projecting lens system 5, respectively.

A stage 8 is movable to-and-fro (in a Y-axis direction) of the projector body 1 by means of guide rails 11 provided on right and left upper sides of the projector body 1. A pair of guide plates 9 and 10 are provided at the upper face on front and rear sides of the stage in a direction (an X-axis direction) orthogonal to the Y-axis direction. A stage window 13 elongated in the Y-axis direction is provided at the center of the stage 8 such that light beams emitted from the light source through the projecting condenser lens 2 and required for projecting may not be interrupted by the stage even when the stage 8 moves in the Y-axis direction.

Figure 3A:
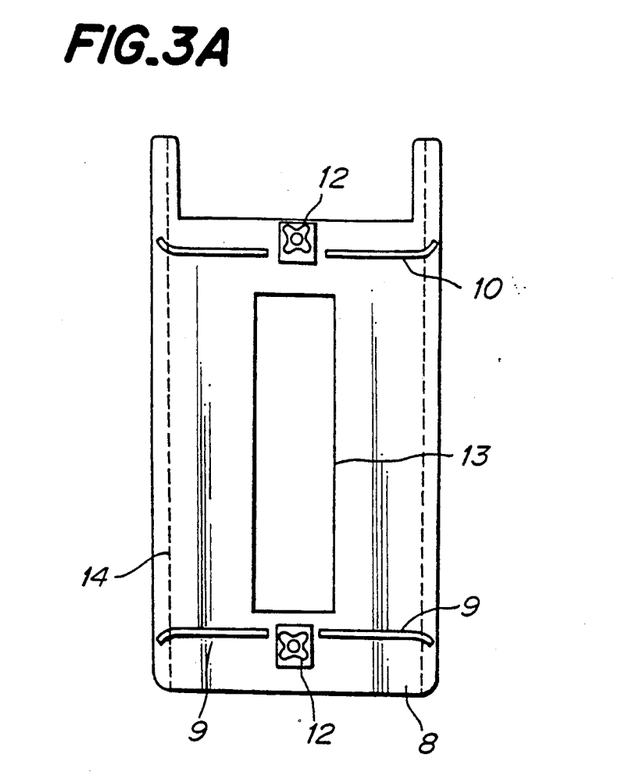
FIGS. 3A and 3B are a plan view and a front view of a stage, respectively.
Figure 3B:
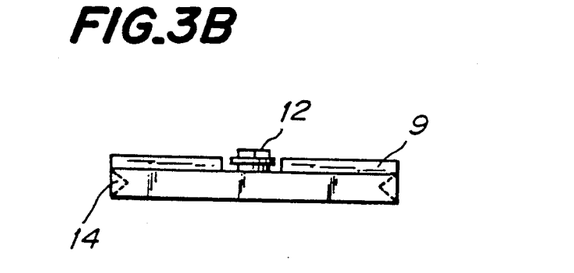

A reference numeral 12 is a file sheet keep piece, which is vertically movably located at the center of each of the guide plates 9 and 10 as shown in FIG. 3. A file sheet is prevented from floating by downwardly pressing it with the hold pieces at side edge portion of the file sheet.

Figure 2:
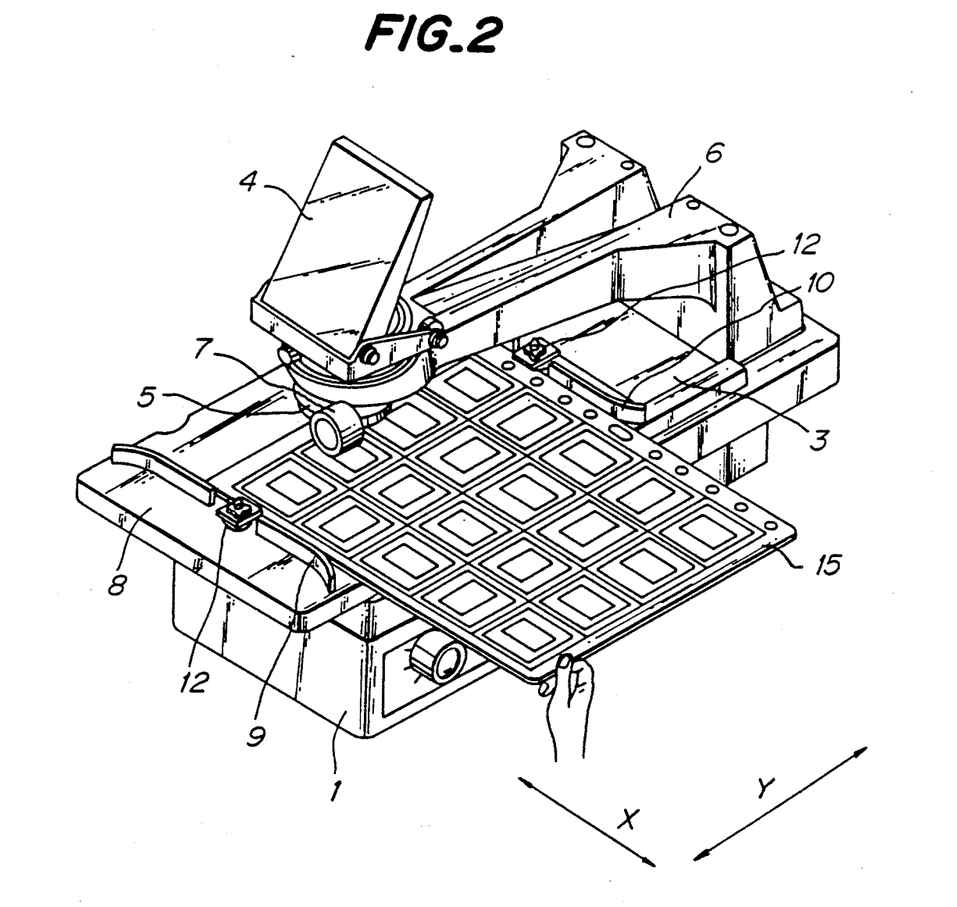
FIG. 2 is a perspective view illustrating a use state of the first embodiment.

Since the projector according to the present invention is constituted in this manner, as shown in FIG. 2, desired objects on the file sheet are projected in an enlarged scale by moving the file sheet 15 to-and-fro and right and left. That is, the file sheet 15 is placed on the upper face of the stage 8, while the upper and lower end portions are sandwiched between the guide plates 9 and 10 to prevent deviation, and the file sheet is prevented from being floated by vertically adjusting the file sheet hold piece 12. By moving the stage in the Y-axis direction, it is possible to select any arbitrary one of rows vertically arrayed in the file sheet 15. In order to select any one of laterally arranged frames in the thus selected one of the rows, the file sheet 15 may be moved by grasping an edge portion of the file sheet 15 and moving it in the X-axis direction. In this case, the file sheet 15 can easily be moved along opposed inner surfaces of the guide plates 9 and 10 without using the stage 8 or another stage movable in the X-axis direction.

The stage 8 is moved in the Y-axis direction in such a manner that stage rails 14 provided on the lower side of the stage 8 slide along the guide rails 11 provided on the upper portion of the projector body 1 through slide rollers (not shown). In order that the stage 8 may be moved at a specific pitch corresponding to the size of each frame of the file sheet 15, pitch grooves are formed in either one of the projector body 1 and the inside of the stage 8, a pitch roller are provided on the other, and appropriate pitch movement of the file sheet 15 can be confirmed when the pitch roller is engaged with the pitch groove.

Figure 4:
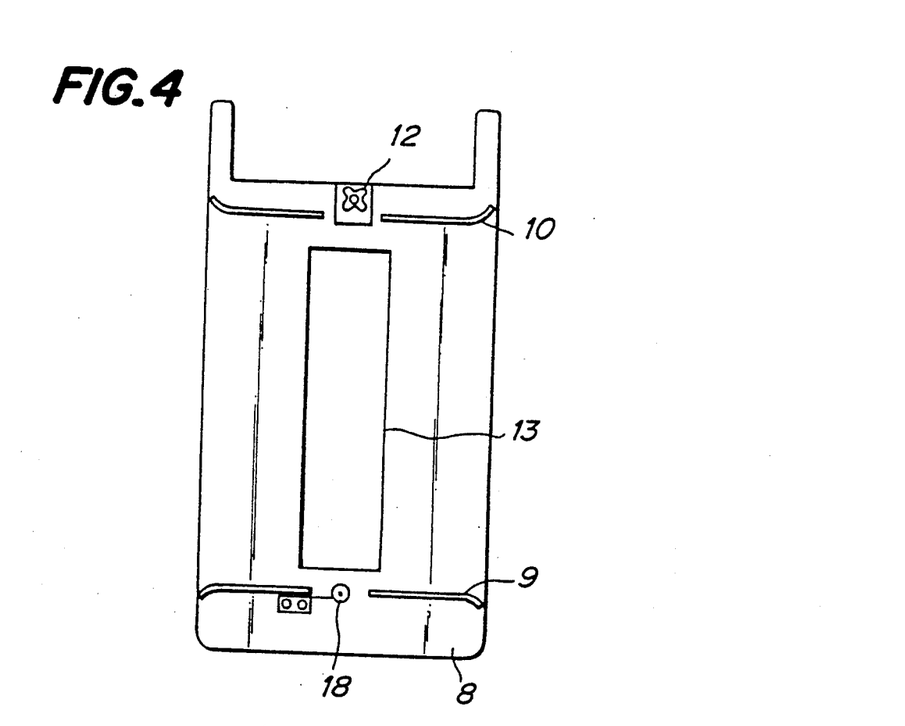
FIG. 4 is a plan view of a second embodiment of the stage in the present invention.
Figure 10:
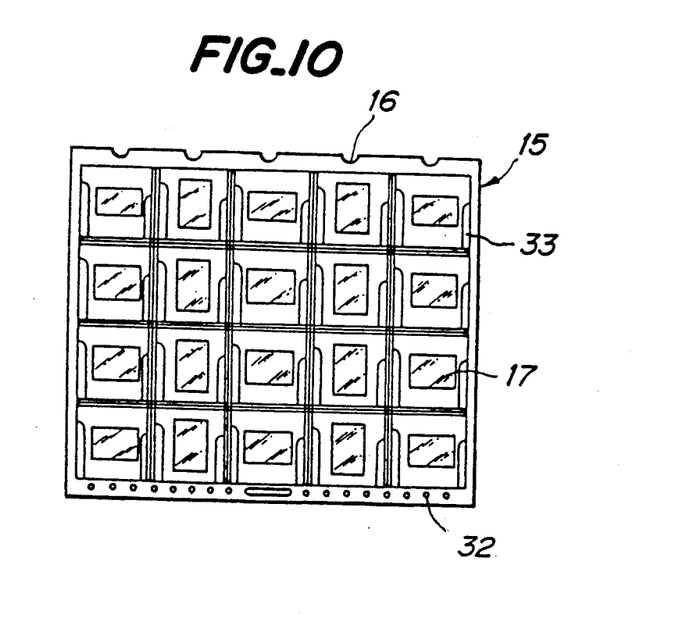
FIG. 10 is a front view of a file sheet.
Figure 11:
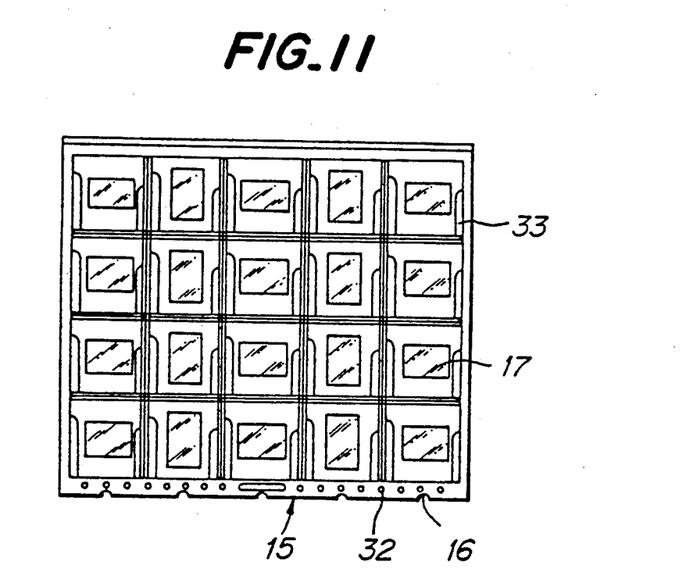
FIG. 11 is a modification of FIG. 10.

FIG. 4 shows a stage as a second embodiment for the overhead type file sheet projector. In order to move the file sheet 15 on the stage 8 in the X-axis direction, a click stop roller 18 is provided in the center of one of the guide plates 9, instead of the file hold piece. The roller 18 is supported by a spring. Thereby, a file sheet 15 having cuts 16 formed at its end portion as shown in FIGS. 10 and 11A and 11B can smoothly be moved in the X-axis direction at a specific pitch.

Figure 5A:
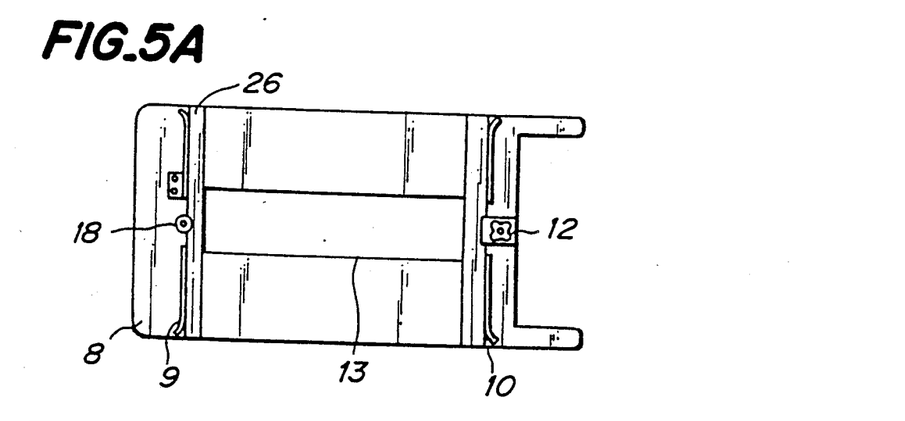
FIGS. 5A and 5B are a plan view and a side view of a third embodiment of the stage in the present invention, respectively.
Figure 5B:
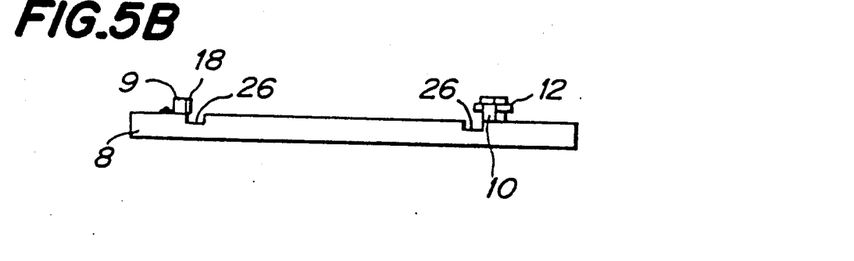

FIGS. 5A and 5B show another stage as a third embodiment for the overhead type file sheet projector, which is a modification of the second embodiment. The file holder comprises grooves 26 for receiving an edge portion 25 and a support member 28 (see FIGS. 11A and 11B). Thereby, the jacket holder can smoothly be moved on the stage 8 in the X-axis direction at a specific pitch.

Figure 6A:
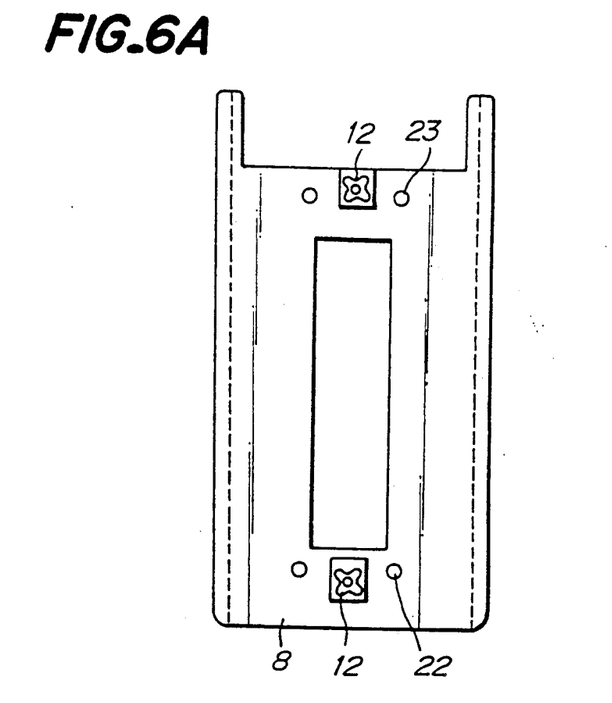
FIGS. 6A and 6B are a plan view and a front view of a fourth embodiment of the stage in the present invention, respectively.
Figure 6B:
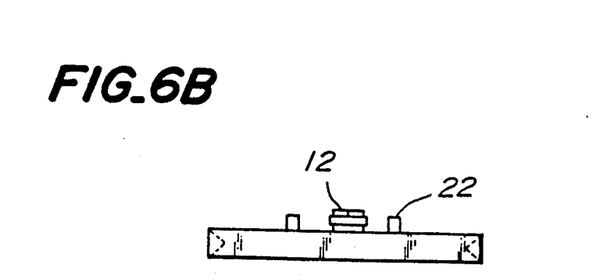

FIGS. 6A and 6B show a still another stage as a fourth embodiment of the overhead type file sheet projector, which modifies the first embodiment by providing two round discs 22 and 23 instead of the guide plates. By so constructing, the file sheet 15 can smoothly be moved in the X-axis direction through the minimum point contacts between the edges of the file sheet 15 and the round discs 22 and 23. In order to assure more smooth movement, the round discs 22 and 23 are designed as rotary members.

Figure 7:
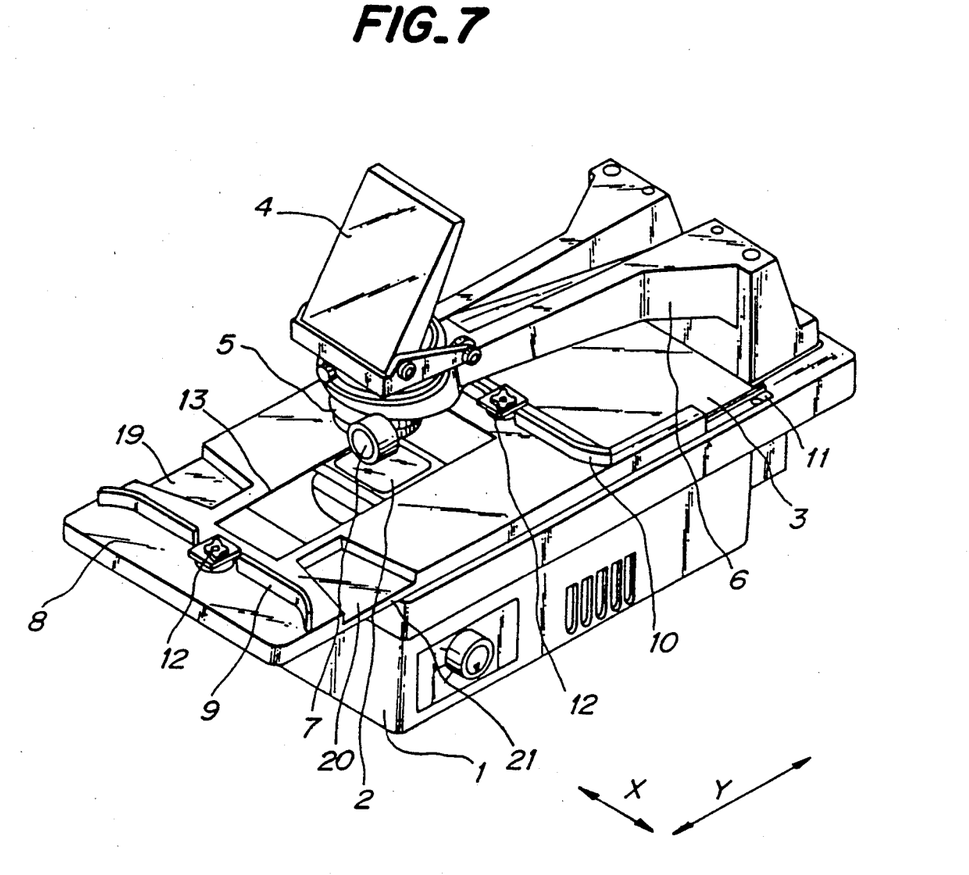
FIG. 7 is a perspective view of a fifth embodiment according to the present invention.

FIG. 7 is a perspective view of a fifth embodiment of the overhead type file sheet projector, in which file sheet-handling recesses 19 and 20 are provided extending from opposite sides 21 of the stage 8 in the direction orthogonal to the file sheet-moving direction to near the stage window 13. This embodiment is contrived for the following reason.

That is, when the file sheet fitted to the stage 8 is to be moved, an end face of the stage 8 hits upon a finger of a hand to make smooth movement of the file sheet difficult. Therefore, it is necessary that a side portion of the file sheet opposed to a projecting side portion in a moving direction is grasped and pulled by the other hand to some extent. Thus, the inconvenient necessity that the file must be moved by both hands is eliminated.

Figure 8:
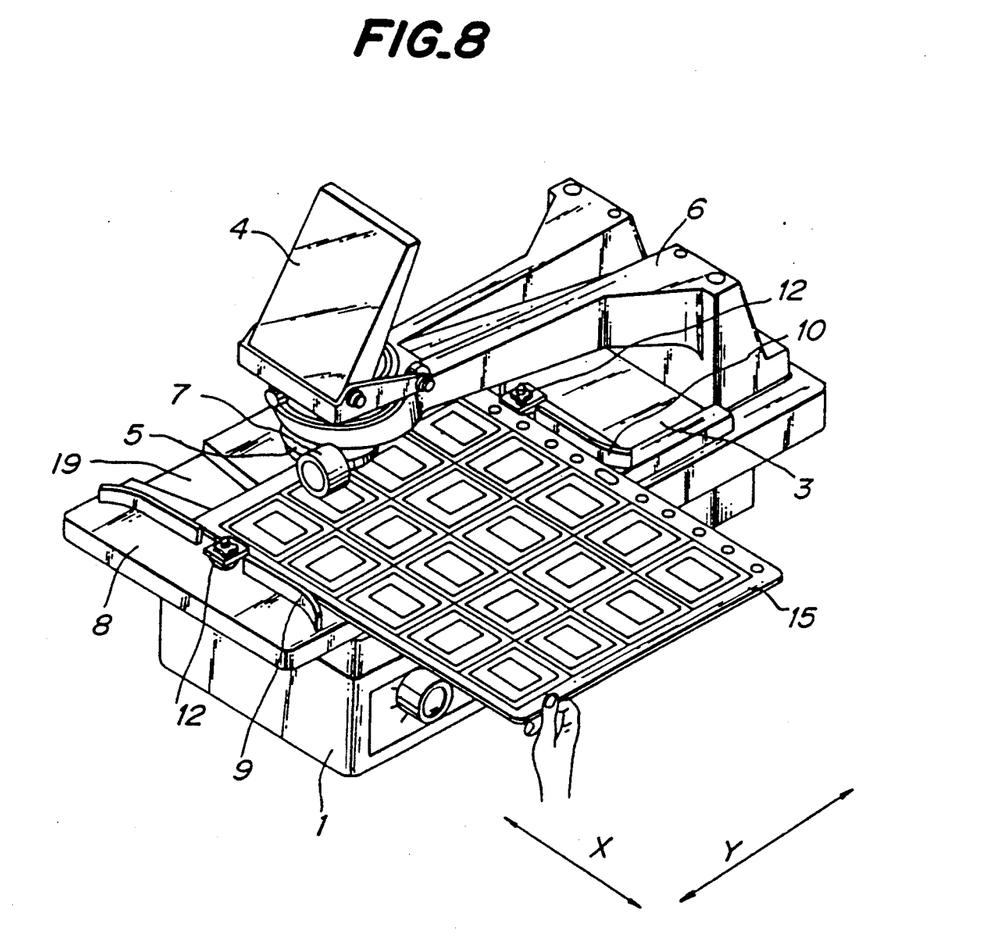
FIG. 8 is a perspective view illustrating a use state of the fifth embodiment.

By so doing, as shown in FIG. 8, when the file sheet 15 is moved in the X-axis direction by grasping an edge of the file sheet 15, the fingers are not hindered by the stage at all until the right test column of the slides in the file is located immediately below the projecting lens system 5.

Figure 9A:
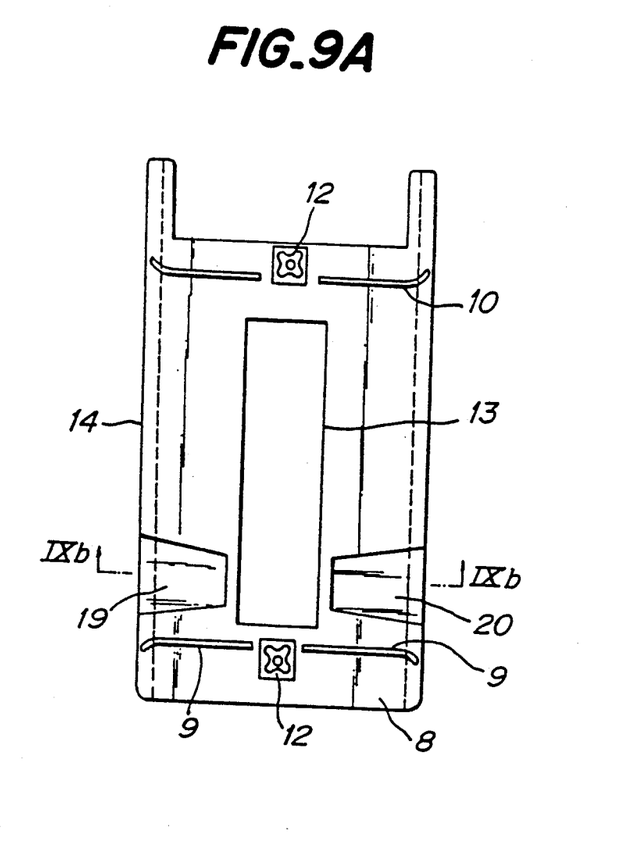
FIGS. 9A and 9B are a plan view and a IXb—IXb sectional view of a stage, respectively.
Figure 9B:
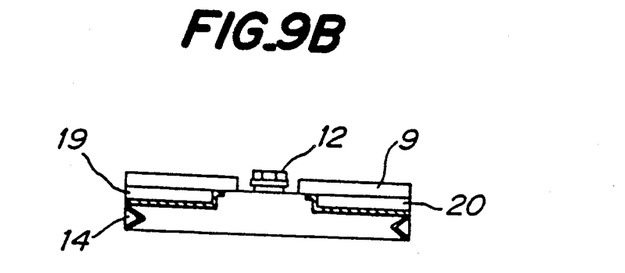

In this embodiment, since the file sheet-handling recesses 19 and 20 are provided on the right and left sides, the file sheet 15 can be moved by one hand only from either side. FIGS. 9A and 9B are a plan view and a IXb—IXb sectional view of a stage, respectively.

Needless to say, a file sheet-handling recess may be formed on either one of the sides of the stage. In this case, the file sheet is moved only in one direction. The file sheet-handling recess is effective when the stage 8 is moved in the Y-axis direction together with the stage 8.

FIG. 10 shows an embodiment of the file sheet. Cuts 16 are formed at an edge portion of the file sheet corresponding to each of slide films. When the file sheet 15 is moved in the X-axis direction, the click stop roller 18 is engaged with the cut 16. Therefore, appropriate pitch movement of the file sheet can be realized. Reference numerals 17 and 32 are a slide film inserted into the file sheet 15 and a binding hole, respectively. A reference numeral 33 is a lug for holding a slide.

FIG. 11 is a modification of FIG. 10, in which cuts 16 are formed on the opposite edge portion of the file sheet.

The cuts 16 may be formed on either one of the edges of the file sheet depending upon the construction of the stage, and the kind of the file sheet. Further, in FIGS. 10 and 11, the cuts are formed only in one edge portion of the file sheet. Such cuts 16 may be formed in the opposite edge portions of the file sheet to facilitate smooth pitch movement. Further, cuts 16 may be formed in more than two edge portions of the file sheet so that the file sheet may be suited for more than one kind of stages.

Figure 12:
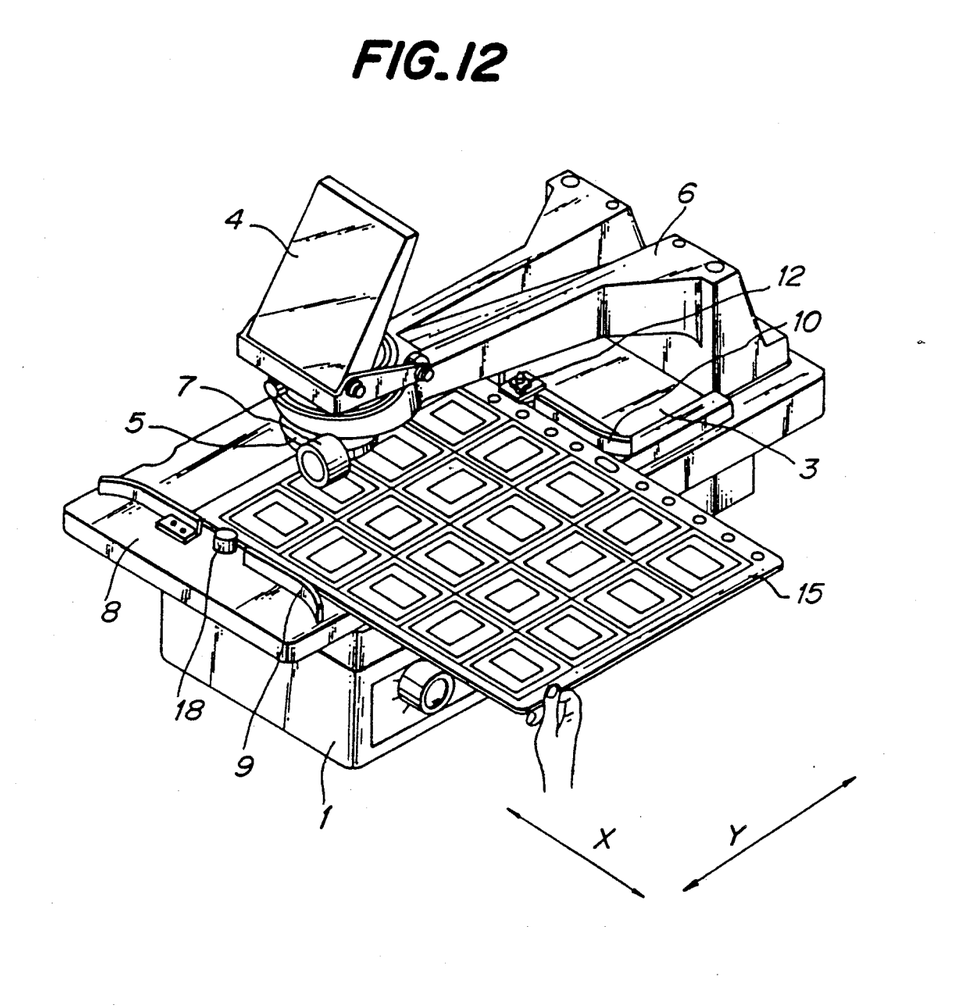
FIG. 12 is a use state in which the file sheet in FIG. 10 is mounted on the projector.

FIG. 12 shows the use state in which the file sheet shown in FIG. 10 is mounted on a projector with the stage as shown in FIGS. 5A and 5B.

Figure 13A:
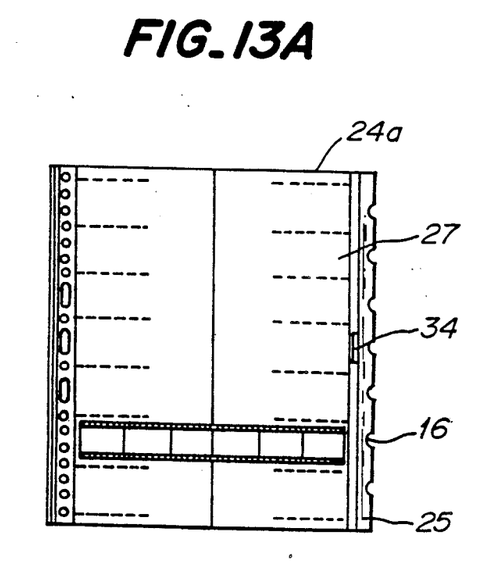
FIGS. 13A and 13B are a plan view and a side view of a jacket holder, respectively.
Figure 13B:
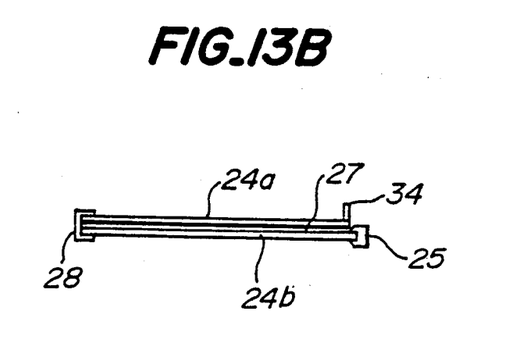

FIGS. 13A and 13B show an embodiment of the jacket. The hard file sheet 15 as shown in FIG. 10 may be directly moved on the stage. If a film strip is to be projected in the state that it is inserted into the jacket 27, it is difficult to directly place and move the jacket 27 on the stage 8, because the entire assembly is thin and soft. For this reason, the soft jacket 27 is moved on the stage 8 in the stage that the jacket 27 is sandwiched by jacket holding members 24a and 24b as shown in FIGS. 13A and 13B. A reference numeral 34 is a knob for opening or closing the jacket holder.

It goes without saying that the jacket holding members 24a and 24b are constituted by a hard transparent material such as a glass plate so that no trouble may occur in the projection of the films in the jacket 27. The jacket holding members 24a and 24b can be moved by a specific pitch by forming a pitch movement cuts 16 at an edge 25 of each of the jacket holding members 24a and 24b, which cuts are to be engaged with "a jacket pitch movement fitting member" such as a click stop roller 18. A reference numeral 28 is a support for allowing the jacket to be opened in an arcuate fashion. Needless to say, the position of the cuts 16 is not limited to one in this embodiment.

As mentioned above, according to the present invention, the number of parts which hinders locating of the file sheet onto the stage is reduced to make the attachment and detachment of the file sheet extremely easy. Further, the file sheet can be moved to-and-fro and right and left by using a single stage. Thus, the construction is simplified, and movement of the file sheet can be facilitated. Consequently, the projector can be less expensively produced.

Further, when the file-handling recesses are formed in the stage, the file sheet can be moved to a desired location by a single hand without being hindered by the stage.

What is claimed is:

1. An overhead type file sheet projector comprising
a projector body with a cover provided at an upper face opening thereof,
a light source and a projecting condenser lens placed in the projector body,
a support arm extending from one side of the projector body to above said projecting condenser lens,
a reflecting mirror and a projecting lens system held by the support arm,
a single stage movably fitted to guide rails provided at opposite sides of an upper portion of the projector body,
guide members fixed on opposite sides of the stage, said guide members being adapted to allow manual movement of a file sheet therebetween in a direction orthogonal to the guide rails along the guide members in a direction orthogonal to the moving direction of the stage,
said guide members including planar members tapering inwardly towards a central portion for guiding the file sheet towards the central portion and sandwiching opposite sides of the file sheet at the central portion, and
means located centrally of the central portion of said guide members for maintaining the position of a file sheet.

2. A file sheet for use in an overhead type projector, said file sheet comprising a file sheet body being adapted to detachably mount a plurality of slides thereon, and pitch movement cuts formed in at least one side of the file sheet body, said overhead type projector comprising a projector body with a cover provided at an upper face opening thereof, a light source and a projecting condenser lens placed in the projector body, a support arm extending from one side of the projector body to above said projecting condenser lens, a reflecting mirror and a projecting lens system held by the support arm, a stage movably fitted to guide rails provided at opposite sides of an upper portion of the projector body and a guide member provided on the stage, said guide member being adapted to allow movement of the file sheet in a direction orthogonal to the guide rails, a file sheet pitch movement fitting member provided on the stage, said pitch movement cuts being adapted to be fitted into the file sheet pitch movement fitting member.

3. A jacket holder for use in an overhead type file sheet projector, said jacket holder comprising a jacket holder body and pitch movement cuts provided in at least one side of the jacket holder body for holding films, said overhead type file sheet projector comprising a projector body with a cover provided at an upper face opening thereof, a light source and a projecting condenser lens placed in the projector body, a support arm extending from one side of the projector body to above said projecting condenser lens, a reflecting mirror and a projecting lens system held by the support arm, a stage movably fitted to guide rails provided at opposite sides of an upper portion of the projector body, and guide members and a pitch movement fitting member provided on the stage, said guide members being adapted to allow movement of the file sheet in a direction orthogonal to the guide rails, said pitch movement cuts being adapted to be fitted to said pitch movement fitting member.

4. A file sheet for use in an overhead type file sheet projector, said file sheet comprising a file sheet body on which a plurality of slides are to be detachably mounted, and pitch movement cuts formed in at least one edge of the file sheet body, said pitch movement cuts being formed such that when the file sheet is fitted to the overhead type file sheet projector, the pitch movement cuts may be engaged with a file sheet pitch movement fitting member formed on a stage movably placed on an upper portion of a projector body of the overhead type file sheet projector.

5. A jacket holder for use in an overhead type file sheet projector, said jacket holder comprising a jacket holder body adapted for holding a jacket to hold slide films, and pitch movement cuts formed in at least one edge of the jacket holder body, said pitch movement cuts being formed such that when the jacket holder is fitted to the overhead type file sheet projector, the pitch movement cuts may be engaged with a jacket holder pitch movement fitting member formed on a stage movably placed on an upper portion of a projector body of the overhead type file sheet projector.

6. An overhead type file sheet projector comprising a projector body with a cover provided at an upper face opening thereof, a light source and a projecting condenser lens placed in the projector body, a support arm extending from one side of the projector body to above said projecting condenser lens, a reflecting mirror and a projecting lens system held by the support arm, a stage movably fitted to guide rails provided at opposite sides of an upper portion of the projector body, and guide members provided on the stage, said guide members being adapted to allow movement of the file sheet in a direction orthogonal to the guide rails, said guide members comprise a plurality of round discs for sandwiching opposite sides of the file sheet.

7. An overhead type file sheet projector comprising a projector body with a cover provided at an upper face opening thereof, a light source and a projecting condenser lens placed in the projector body, a support arm extending from one side of the projector body to above said projecting condenser lens, a reflecting mirror and a projecting lens system held by the support arm, a stage movably fitted to guide rails provided at opposite sides of an upper portion of the projector body, and guide members provided on the stage, said guide members being adapted to allow movement of the file sheet in a direction orthogonal to the guide rails, a file sheet-handling recess being formed at a portion of the stage on at least one of the sides thereof orthogonal to the moving direction of the file sheet, said file sheet-handling recess being located from said at least one of the sides to a given location spaced therefrom in said moving direction of the file sheet.

* * * * *